United States Patent
Satran et al.

(10) Patent No.: US 6,974,280 B2
(45) Date of Patent: Dec. 13, 2005

(54) ROTARY CUTTING TOOL

(75) Inventors: Amir Satran, Kfar Vradim (IL); Yaron Eisen, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/002,180

(22) Filed: Dec. 5, 2001

(65) Prior Publication Data

US 2002/0066352 A1 Jun. 6, 2002

(30) Foreign Application Priority Data

Dec. 5, 2000 (IL) .................................. 140104

(51) Int. Cl.[7] .............................................. B23C 5/02
(52) U.S. Cl. ....................................... 407/42; 407/113
(58) Field of Search .......................... 407/42, 113, 114; 83/839, 847, 853, 955

(56) References Cited

U.S. PATENT DOCUMENTS

| | | | | |
|---|---|---|---|---|
| 1,729,050 A | * | 9/1929 | Olson | 407/61 |
| 3,828,409 A | * | 8/1974 | Aspinwall | 407/61 |
| 4,729,697 A | * | 3/1988 | Lacey | 407/42 |
| 5,123,786 A | * | 6/1992 | Yates et al. | 407/38 |
| 5,529,440 A | * | 6/1996 | Schmidt | 407/113 |
| 5,647,263 A | * | 7/1997 | Wildey | 83/835 |
| 5,685,670 A | * | 11/1997 | Satran | 407/42 |
| 5,718,540 A | * | 2/1998 | Satran et al. | 407/42 |
| 6,074,137 A | * | 6/2000 | Betman et al. | 407/103 |
| 6,126,366 A | * | 10/2000 | Lundblad | 407/102 |
| 6,167,958 B1 | * | 1/2001 | Lynde | 166/55.6 |
| 6,227,772 B1 | * | 5/2001 | Heinloth et al. | 407/113 |
| 6,238,146 B1 | * | 5/2001 | Satran et al. | 407/113 |
| 6,527,486 B2 | * | 3/2003 | Wiman et al. | 408/188 |
| 6,810,783 B1 | * | 11/2004 | Larose | 83/840 |

FOREIGN PATENT DOCUMENTS

| | | | | |
|---|---|---|---|---|
| EP | 0 125 568 | * | 11/1984 | |
| EP | 0 505 574 B1 | | 9/1992 | ............ B23C 5/22 |
| WO | WO 00/02693 | * | 1/2000 | |

* cited by examiner

Primary Examiner—Kenneth E. Peterson
(74) Attorney, Agent, or Firm—Womble Carlyle

(57) ABSTRACT

A rotary cutting tool having the general form of a circular disk with cutting inserts secured tangentially to the circumference of the tool's body, for metal machining in general and for machining cam lobes. The cutting inserts have concave side surfaces and concave cutting edges.

13 Claims, 4 Drawing Sheets

US 6,974,280 B2

ROTARY CUTTING TOOL

FIELD AND BACKGROUND OF THE INVENTION

This invention relates to rotary cutting tools having a tool body the general form of a circular disk with cutting inserts secured tangentially to the circumference of the tool body, for metal machining in general and for machining cam lobes of camshafts of internal combustion engines in particular. Such cutting tools normally employ groups of two or more cutting inserts arranged in a circumferentially staggered formation. The individual cutting edges of the cutting inserts in each group are generally oriented at non-zero lead angles. Consequently, each cutting insert has a non-zero axial component cutting force acting on it. Since the cutting inserts are staggered, the cutting tool is unbalanced with respect to the axial component cutting forces.

SUMMARY OF THE INVENTION

It is an object of the present invention to provide a cutting tool of the above general nature that replaces each group of cutting inserts arranged in a staggered formation by a single indexable cutting insert giving rise to a balanced cutting tool with respect to the axial component cutting forces.

In accordance with the present invention there is provided a rotary cutting tool comprising:

a tool body in the form of a circular disk having a center and a periphery, with an axis of rotation passing through the center of the disk and a plurality of chip clearance recesses opening outwardly from and spaced angularly around the disk periphery, each chip clearance recess having a leading end and a trailing end;

a plurality of insert receiving pockets, each insert receiving pocket having an associated chip clearance recess and comprising a tangentially extending pocket base having a leading end and a trailing end, the leading end of the pocket base being adjacent the trailing end of the associated chip clearance recess and the trailing end of the pocket base being connected to a generally radially extending pocket rear surface;

a plurality of indexable cutting inserts, each cutting insert comprising an upper surface, a lower surface and a peripheral side surface therebetween, the peripheral side surface comprising four component side surfaces, each component side surface being joined to an adjacent side surface by a side corner, an opposite pair of the component side surfaces forming front and rear component side surfaces, each component side surface meeting the upper and lower surfaces at upper and lower component cutting edges, respectively, at least outer portions of each upper and lower component cutting edge extending generally inwardly from adjacent side corners and at least outer portions of each component side surface extending generally inwardly from adjacent side corners, each cutting insert being removably retained in a given insert receiving pocket, wherein the lower surface of the cutting insert abuts the tangentially extending pocket base, the rear component side surface of the cutting insert abuts at two spaced apart abutment surfaces of the radially extending pocket rear surface, the front component side surface forming a rake surface and the upper component cutting edge of the front component side surface forming an operative cutting edge with outer portions of the operative cutting edge forming equally leading portions thereof.

In order to secure the cutting inserts in position, the pocket base has a radially extending threaded bore and each cutting insert of the plurality of cutting inserts has a through bore extending between the upper and lower surfaces and containing midpoints thereof, and each cutting insert is secured by a screw extending through the through bore and tightened into the threaded bore.

In accordance with a preferred embodiment of the present invention, each upper and lower component cutting edge is generally concave in form and each component side surface is generally concave in form extending inwardly from adjacent side corners.

Preferably, the upper and lower surfaces of the cutting insert each have a flat central portion for abutting the pocket base.

Further preferably, the upper and lower component cutting edges and the component side surfaces are divided into three portions, two outer portions and an inner portion, and the cutting insert is thicker in the region of the inner portion of the upper and lower component cutting edges than in the region of the outer portion thereof.

BRIEF DESCRIPTION OF THE DRAWINGS

For a better understanding the invention will now be described, by way of example only, with reference to the accompanying drawings in which.

DETAILED DESCRIPTION OF A PREFERRED EMBODIMENT

Figure 1:
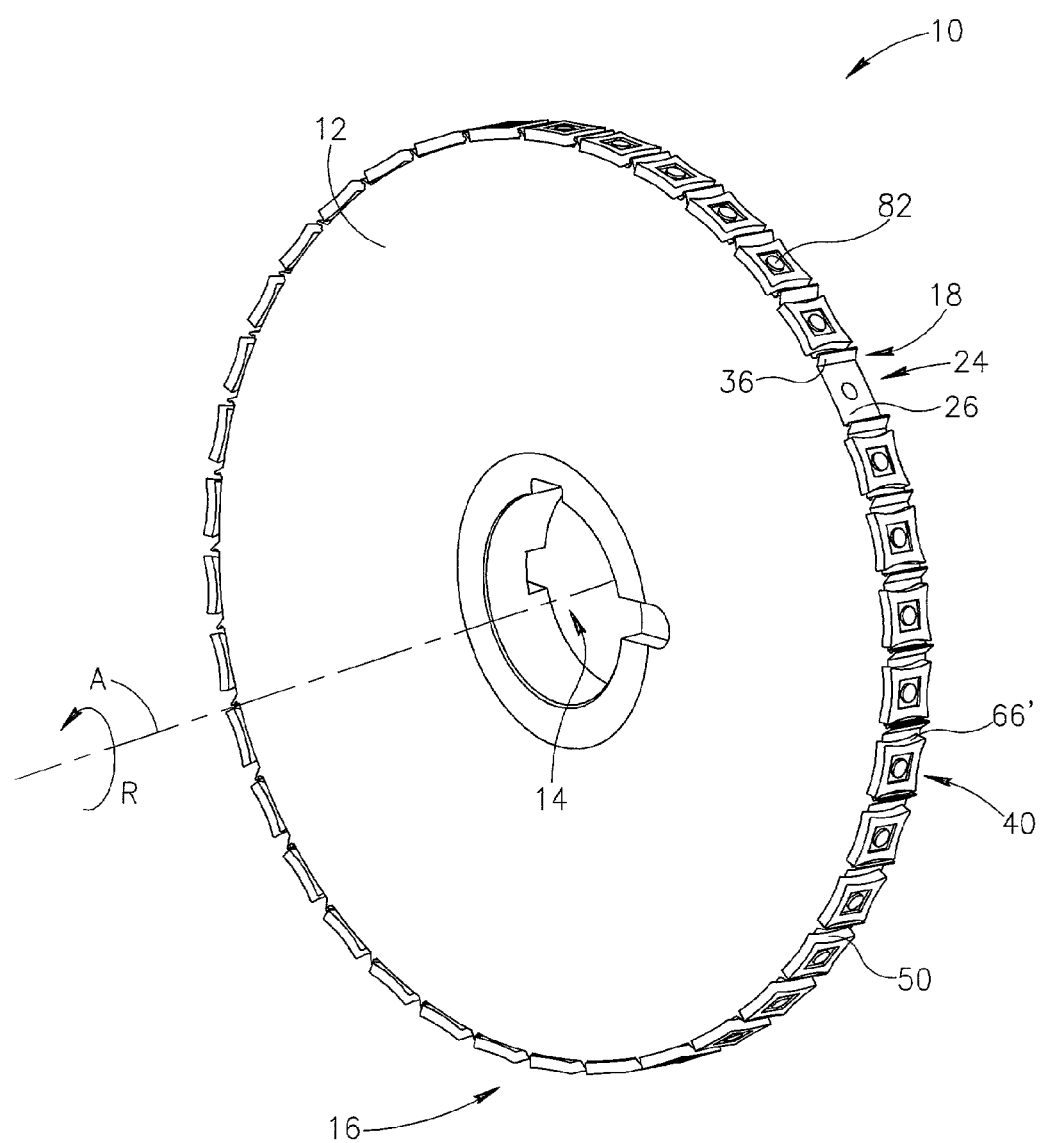
FIG. 1 is a perspective view of a rotary cutting tool in accordance with the present invention.

Attention is drawn to the drawings in general and to FIG. 1 in particular, showing a rotary cutting tool in accordance with the present invention. The rotary cutting tool 10 comprises a tool body 12 in the form of a circular disk having a center 14 and a periphery 16. The rotary cutting tool 10 has an axis of rotation A that passes through the center 14 of the tool body 12, the axis of rotation defining the tool's plane of rotation P. The tool body 12 has a plurality of chip clearance recesses 18 opening outwardly from and spaced angularly around the tool body 12 periphery 16, each chip clearance recess having a leading end 20 and a trailing end 22. It will be appreciated that the leading end 20 precedes the trailing end 22 with respect to the direction of rotation R of the rotary cutting tool 10.

Associated with each chip clearance recesses 18 is an insert receiving pocket 24. All the insert receiving pockets are at the same radial distance from the center 14 of the tool body 12. Each insert receiving pocket 24 comprises a tangentially extending pocket base 26 that is parallel to the axis of rotation A, the pocket base having a leading end 28 and a trailing end 30. The leading end 28 of the pocket base being adjacent the trailing end 22 of the associated chip clearance recess 18. The trailing end 30 of the pocket base 26 being connected to a generally radially extending, substantially upright, pocket rear surface 32. It will be appreciated that the term radially extending, is defined with respect to the axis of rotation A, whereas the term upright, is defined relative to the pocket base 26. The pocket rear surface 32 and the pocket base 26 are separated by a stress relief groove 34. It will be appreciated that when a workpiece (e.g., cam lobe) is machined, a leading portion of a given part of the cutting tool 10 will reach the workpiece before the trailing portion of that given part, as the cutting tool rotates.

Figure 2:
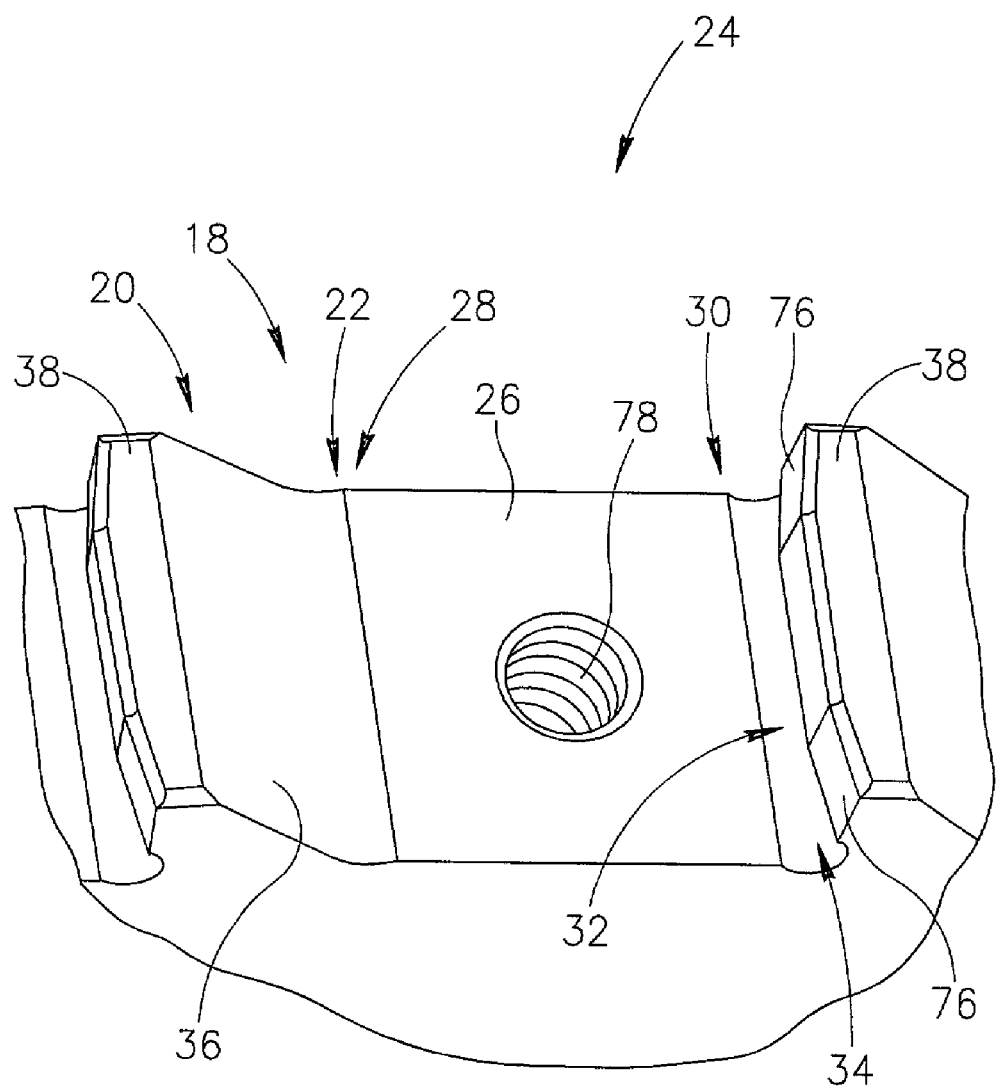
FIG. 2 is a perspective top view of a cutting insert receiving pocket in the rotary cutting tool shown in FIG. 1.
Figure 6:
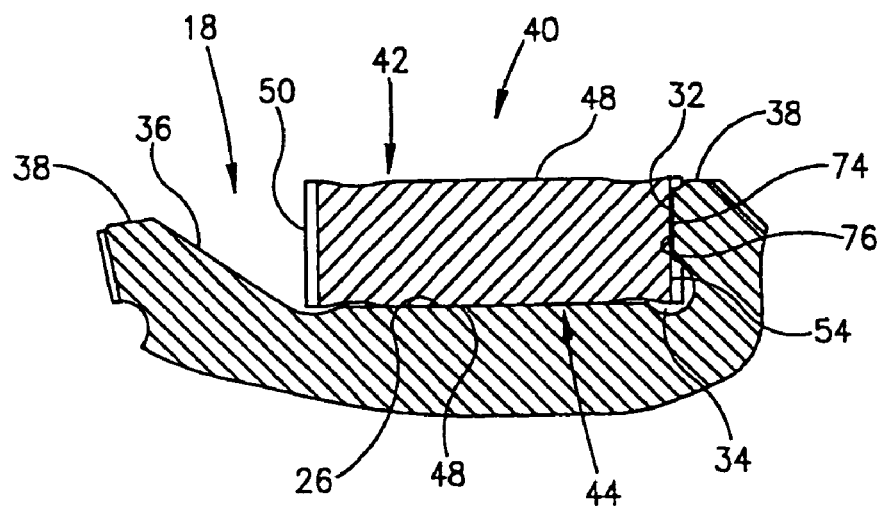
FIG. 6 is a cross section taken along the line VI—VI in FIG. 5.

As can be seen in the figures, each chip clearance recess 18 has a sloping chip deflecting surface 36 that slopes upwardly from the trailing end 22 of the chip clearance recess 18 to the leading end 20 thereof where it joins a circumferential portion 38 at the periphery 16 of the tool body 12. As can be clearly seen in FIGS. 2 and 6, the chip clearance recess 18 together the associated insert receiving pocket 24 form a peripheral recess in the periphery 16 of the tool body 12. The circumferential portions 38 on either side of such a peripheral recess belong to the circumference of the tool body, which would be a complete cylindrical surface if it were not for the presence of the peripheral recesses.

Figure 5:
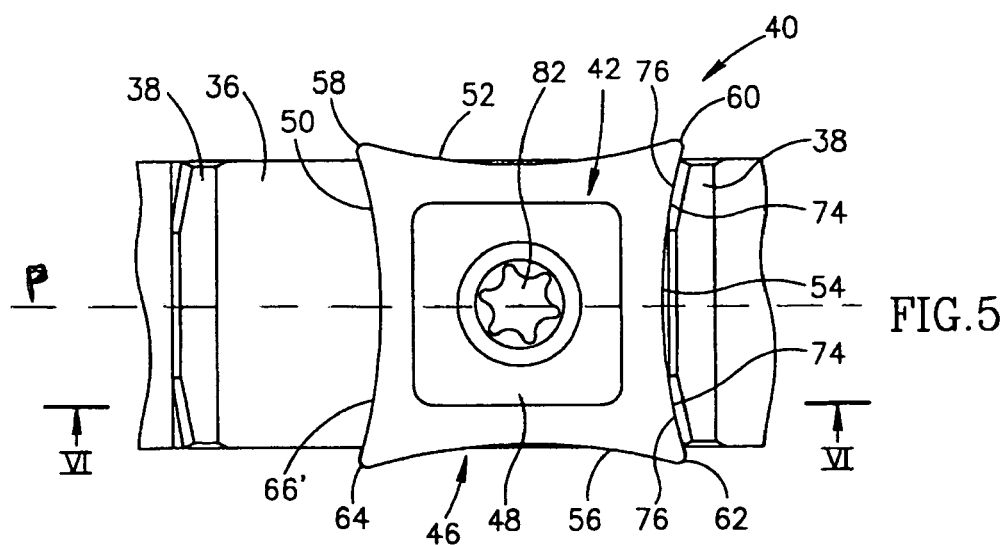
FIG. 5 is a top view of a cutting insert receiving pocket in the rotary cutting tool shown in FIG. 1 with a cutting insert retained therein.

In each insert receiving pocket 24 there is retained an indexable cutting insert 40. As depicted in FIGS. 1 and 5, all the cutting inserts are symmetric about a common plane of rotation P. Furthermore, each of the cutting inserts 40 in the rotary cutting tool 10 axially protrudes (i.e., protrudes along the rotary axis A) on both sides of the tool body 12 in a top view. And unlike cutting inserts arranged in the prior art circumferentially staggered formations, all the cutting inserts 40 in rotary cutting tool 10 are aligned with one another in the axial direction, each component side surface of one cutting insert being axially aligned with a corresponding component side surface of each of the other cutting inserts. Each cutting insert 40 comprises an upper surface 42, a lower surface 44 and a peripheral side surface 46 therebetween. The upper surface 42 and lower surfaces 44 each have a flat central portion 48. The peripheral side surface 46 comprises four component side surfaces 50, 52, 54, 56, each component side surface being joined to an adjacent side surface by a side corner 58, 60, 62, 64. An opposite pair of component side surfaces form front 50 and rear 54 component side surfaces. In terms of the rotation of the rotary cutting tool 10, the front component side surface 50 is situated at the leading end of the cutting insert 40, whereas the rear component side surface 54 is situated at the trailing end of the cutting insert 40. Similarly, the side corners 58, 64 adjacent the front component side surface 50 are leading side corners. Furthermore, each cutting insert 40 has another opposite pair of its component side surface 52, 56 symmetrical with respect to the plane of rotation P of the cutting tool 10 and therefore the leading side corners 58, 64 are equally leading side corners. Each component side surface 50, 52, 54, 56 meets the upper surface at upper component cutting edges 66', 68', 70', 72'. Likewise, each component side is surface 50, 52, 54, 56 meets the lower surface at lower component cutting edges 66", 68", 70", 72".

Figure 3:
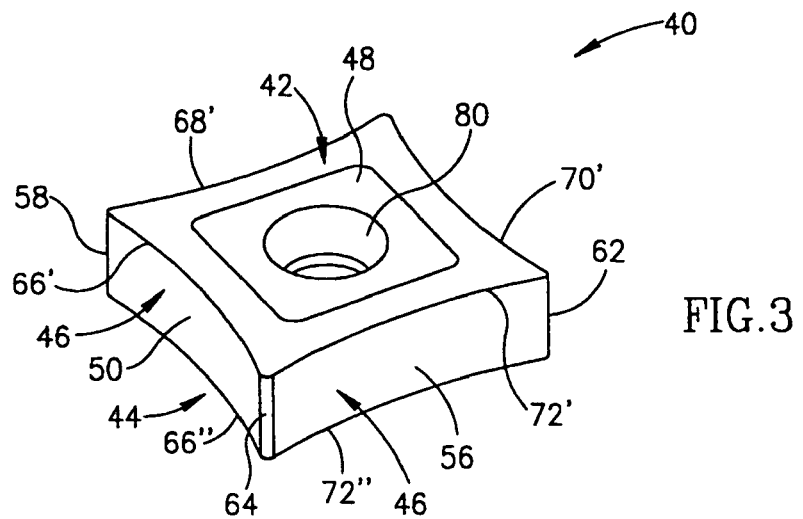
FIG. 3 is a perspective view of a cutting insert retained in the rotary cutting tool in accordance with the present invention.
Figure 4:
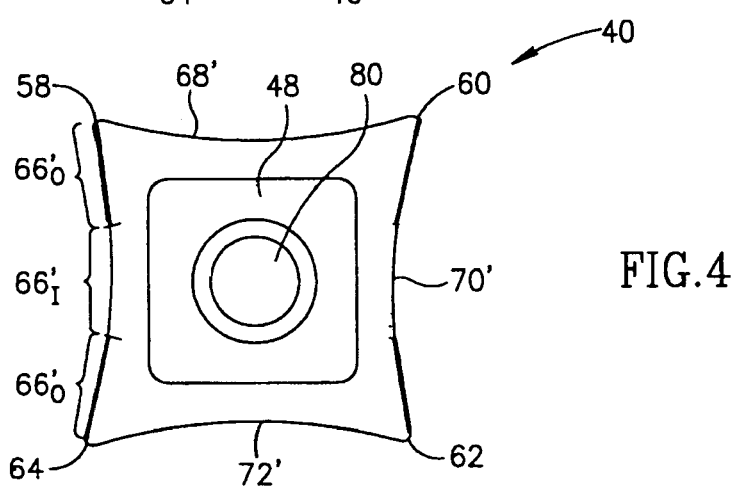
FIG. 4 is a top view of the cutting insert shown in FIG. 3.

As seen in FIG. 3 and especially in the top view of the cutting insert 40 in FIG. 4, each upper component cutting edge 66', 68', 70', 72' and each lower component cutting edge 66", 68", 70", 72" is generally concave in form and each component side surface 50, 52, 54, 56 is generally concave in form extending inwardly from adjacent side corners 58, 60, 62, 64. By generally concave is meant herein that the upper and lower component cutting edges and the component side surfaces could be, but do not have to be, strictly concave in the sense that portions thereof may be straight as long as they extend inwardly. With reference to FIG. 4, it will be noted that the operative cutting edge 66' are linear sections extending inwardly from adjacent side corners 58, 64 to the inner portion $66_I'$ and the inner portion $66_I'$ is arcurate. In accordance with the definition given herein, the upper component cutting edge 66' is generally concave. In a similar manner all the upper component cutting edges and all the lower component cutting edge and the component side surfaces are generally concave and divided into three portions with the same geomatry as the upper component cutting edge 66'.

The cutting insert 40 is removably retained in the insert receiving pocket 24 with the lower surface 44 of the cutting insert 40 abutting the tangentially extending pocket base 26 and two spaced apart abutment regions 74 of the rear component side surface 54 abutting the radially extending pocket rear surface 32 at two spaced apart abutment surfaces 76 that substantially match in shape the abutment regions 74 of the rear component side surface 54 of the cutting insert 40. It should be noted that the two spaced apart abutment regions 74 of the rear component side surface 54 are linear sections extending inwardly from adjacent side corners 60, 62, as described above with respect to the upper component cutting edge 66'. As seen in the figures, however, the rear component side surface 54 is the only component side surface abutted by the insert receiving pocket 24.

With the cutting insert 40 retained in the insert receiving pocket 24, the front component side surface 50 forms a rake surface of the cutting insert 40 and the upper component cutting edge 66' of the front component side surface 50 forms an operative cutting edge of the cutting insert 40, with the outer portions $66_O'$ forming leading portions of the operative cutting edge 66'. It should be noted that the two outer portions $66_O'$ extend linearly inwardly with the same slope. It will be appreciated that cutting forces acting on the operative cutting edge 66' can be resolved into two mutually perpendicular component cutting forces, an axial and a tangential component. Since the two outer portions $66_O'$ extend linearly inwardly with the same slope and since they lead by equal amounts, the axial component cutting forces acting on the two outer portions $66_O'$ will be equal in magnitude but opposite in direction, and will therefore cancel each other out, giving rise to a balanced rotary cutting tool 10.

The pocket base 26 has a radially extending threaded bore 76 and the cutting insert 40 has a through bore 80 extending between the upper 42 and lower 44 surfaces. The through bore 80 is centrally located and therefore contains the midpoints of the upper 42 and lower 44 surfaces. The cutting insert 40 is removably retained in the insert receiving pocket 24 by a screw 82 which extends through the through bore 80 and is tightened into the threaded bore 76.

It will be appreciated that in order to machine a straight line on a section of a workpiece such as a cam lobe, the operative cutting edge has to lie on the cylindrical circumference of the tool body 12 and therefore the cutting insert 40 has to be thicker in the region of the inner portion $66_I'$ than in the region of the outer portion $66_O'$ of the operative cutting edge 66'. The same thickness relationship holds for all the component cutting edges. For a cutting insert having an average thickness of about 6 millimeters, a side length of about 20 millimeters with the central portion of the component side surface recessed by about 3 millimeters and for a tool body having a diameter of approximately 30 centimeters, the difference in thickness between the inner and outer portions of the cutting insert will be approximately 0.1 millimeter.

Figure 7:
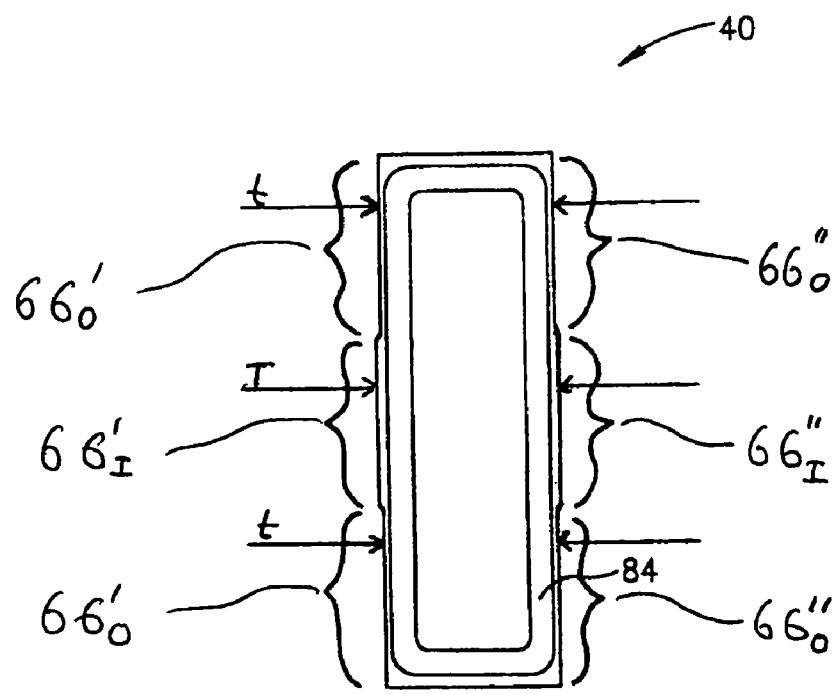
FIG. 7 is a front view of the cutting insert of the invention showing a component side surface having a chip-forming groove.

As indicated in FIG. 7, the region of the inner portion $66_i'$ of the cutting insert 40 has a thickness T which is slightly greater than the thickness t of the outer portions $66_o'$ of the operative cutting edge 66'.

The cutting insert of the preferred embodiment is completely indexable in the sense that all four upper component cutting edges and all four lower component cutting edges can be used as operative cutting edges.

Although not an essential feature of the present invention, it will appreciated that the component side surfaces can include chip forming elements such as chip forming grooves and chip deflectors. As a non-limiting example, a component side surface of the cutting insert 40 of the invention can be provided with a chip forming groove 84 as shown in a front view of the cutting insert in FIG. 7.

Although the present invention has been described to a certain degree of particularity, it should be understood that various alterations and modifications can be made without departing from the spirit or scope of the invention as hereinafter claimed.

What is claimed is:

1. A rotary metal cutting tool comprising:
a tool body in the form of a circular disk having a center and a periphery, with an axis of rotation passing through the center of the disk and a plurality of chip clearance recesses opening outwardly from and spaced angularly around the disk periphery, each chip clearance recess having a leading end and a trailing end, said axis of rotation defining a plane of rotation;
a plurality of insert receiving pockets, each insert receiving pocket having an associated chip clearance recess and comprising a tangentially extending pocket base parallel to said axis of rotation, said pocket base having a leading end and a trailing end, the leading end of the pocket base being adjacent the trailing end of the associated chip clearance recess and the trailing end of the pocket base being connected to a generally radially extending pocket rear surface;
a plurality of indexable cutting inserts, each cutting insert comprising an upper surface, a lower surface and a peripheral side surface therebetween, the peripheral side surface comprising four component side surfaces, each component side surface being joined to an adjacent side surface by a side corner, a first opposite pair of the component side surfaces forming front and rear component side surfaces, each component side surface meeting the upper and lower surfaces at upper and lower component cutting edges, respectively, at least outer portions of each upper and lower component cutting edge extending generally inwardly from adjacent side corners and at least outer portions of each component side surface extending generally inwardly from adjacent side corners,
each cutting insert being removably retained in a given insert receiving pocket, wherein the lower surface of the cutting insert abuts the tangentially extending pocket base, the rear component side surface of the cutting insert abuts the radially extending pocket rear surface at two spaced apart abutment surfaces, the front component side surface forming a rake surface and the upper component cutting edge of the front component side surface forming an operative cutting edge.

2. The rotary metal cutting tool according to claim 1, wherein the pocket base has a radially extending threaded bore and each cutting insert of the plurality of cutting inserts has a through bore extending between the upper and lower surfaces and containing midpoints thereof, and each cutting insert is removably retained by a screw extending through the through bore and tightened into the threaded bore.

3. The rotary metal cutting tool according to claim 1, wherein each upper and lower component cutting edge is generally concave in form and each component side surface is generally concave in form extending inwardly from adjacent side corners.

4. The rotary metal cutting tool according to claim 1, wherein the upper and lower surfaces of the cutting insert each have a flat central portion.

5. The rotary metal cutting tool according to claim 1, wherein the upper and lower component cutting edges and the component side surfaces are divided into three portions, two outer portions and an inner portion, the two outer portions being linear sections and the inner portion being arcuate and wherein the cutting insert is thicker in the region of the inner portion than in the region of the outer portion.

6. The rotary metal cutting tool according claim 1, wherein the upper and lower component cutting edges and the component side surfaces are divided into three portions, two outer portions and an inner portion, and the cutting insert is thicker in the region of the inner portion of the upper and lower component cutting edges than in the region of the outer portion thereof.

7. The rotary metal cutting tool according claim 1, wherein:
each cutting insert has a second opposite pair of its component side surfaces symmetrical with respect to said plane of rotation, and
each cutting insert axially protrudes on both sides of the tool body.

8. A rotary metal cutting tool comprising:
a tool body in the form of a circular disk having a center and a periphery, with an axis of rotation passing through the center of the disk, said axis of rotation defining a plane of rotation;
a plurality of insert receiving pockets spaced angularly around the disk periphery, each insert receiving pocket comprising a tangentially extending pocket base and a pocket rear surface; and
a plurality of indexable cutting inserts, each cutting insert removably retained in an insert receiving pocket, each cutting insert comprising an upper surface, a lower surface which abuts the tangentially extending pocket base, and a peripheral side surface therebetween, the peripheral side surface comprising at least four component side surfaces,
wherein:
each component side surface is joined to an adjacent side surface by a side corner;
each component side surface meets the upper and lower surfaces at upper and lower component cutting edges; and
each upper and lower component cutting edge is generally concave in form and each component side surface is generally concave in form extending inwardly from adjacent side corners;
wherein each cutting insert has:
a first opposite pair of its component side surfaces forming front and rear component side surfaces, the rear component side surface abutting the pocket rear surface at two spaced apart abutment surfaces; and a second opposite pair of its component side surfaces symmetrical with respect to said plane of rotation, and wherein each cutting insert axially protrudes on both sides of the tool body.

9. The rotary metal cutting tool according to claim 8, wherein the pocket base has a radially extending threaded bore and each cutting insert of the plurality of cutting inserts has a through bore extending between the upper and lower surfaces and containing midpoints thereof, and each cutting insert is removably retained by a screw extending through the through bore and tightened into the threaded bore.

10. The rotary metal cutting tool according to claim 8, wherein:

all the cutting inserts are aligned with one another in an axial direction along the axis of rotation, each component side surface of one cutting insert being axially aligned with a corresponding component side surface of each of the other cutting inserts.

11. The rotary metal cutting tool according to claim 8, wherein the upper and lower surfaces of the cutting insert each have a flat central portion.

12. The rotary metal cutting tool according to claim 1, wherein all the cutting inserts are aligned with one another in an axial direction along the axis of rotation, each component side surface of one cutting insert being axially aligned with a corresponding component side surface of each of the other cutting inserts.

13. The rotary metal cutting tool according to claim 8, wherein the rear component side surface is the only component side surface abutted by the insert receiving pocket.

* * * * *